United States Patent Office 2,943,400
Patented July 5, 1960

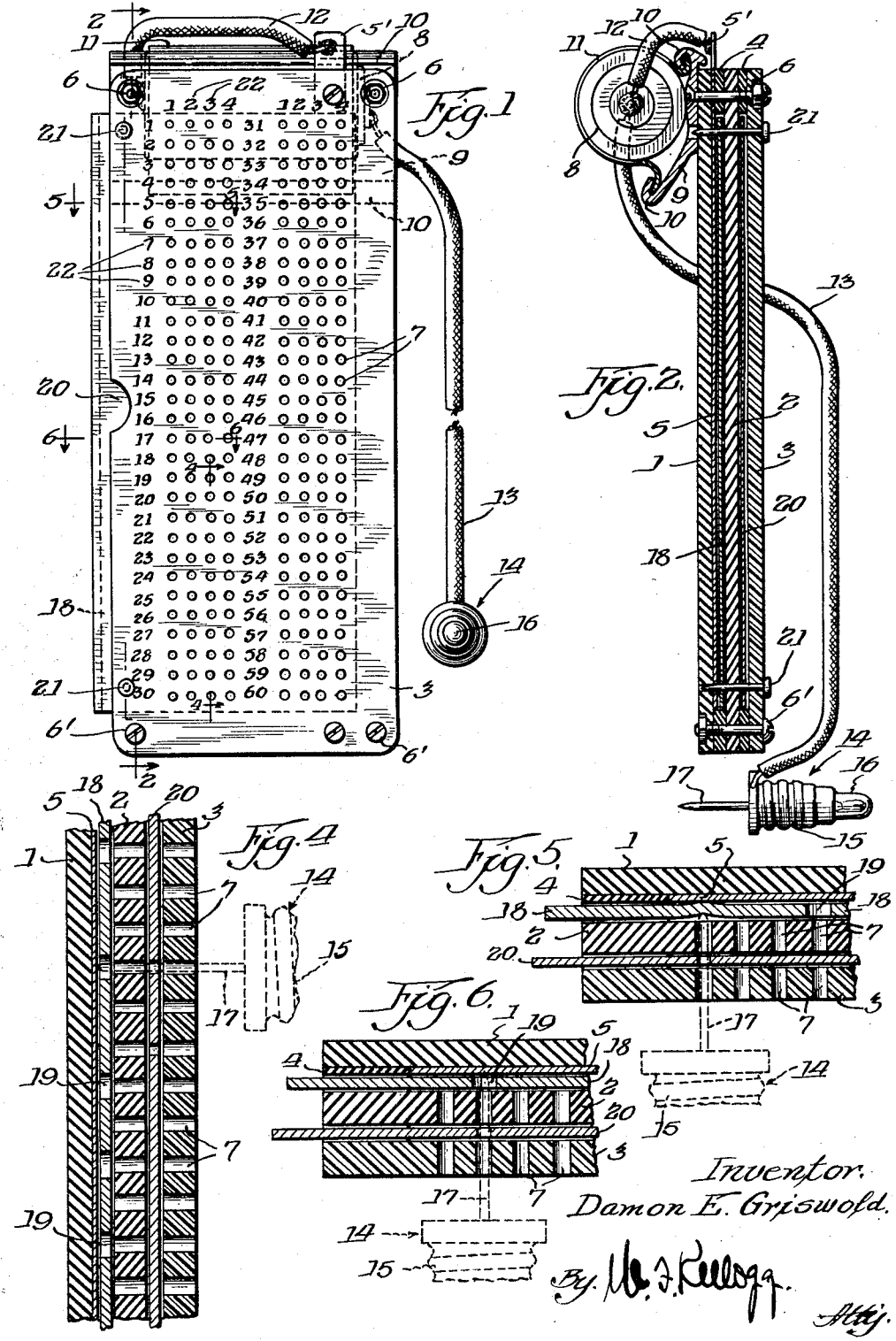
July 5, 1960 — D. E. GRISWOLD — 2,943,400
TESTING AND TEST RECORDING DEVICE
Filed Jan. 14, 1959 — 2 Sheets-Sheet 1
Inventor.
Damon E. Griswold.

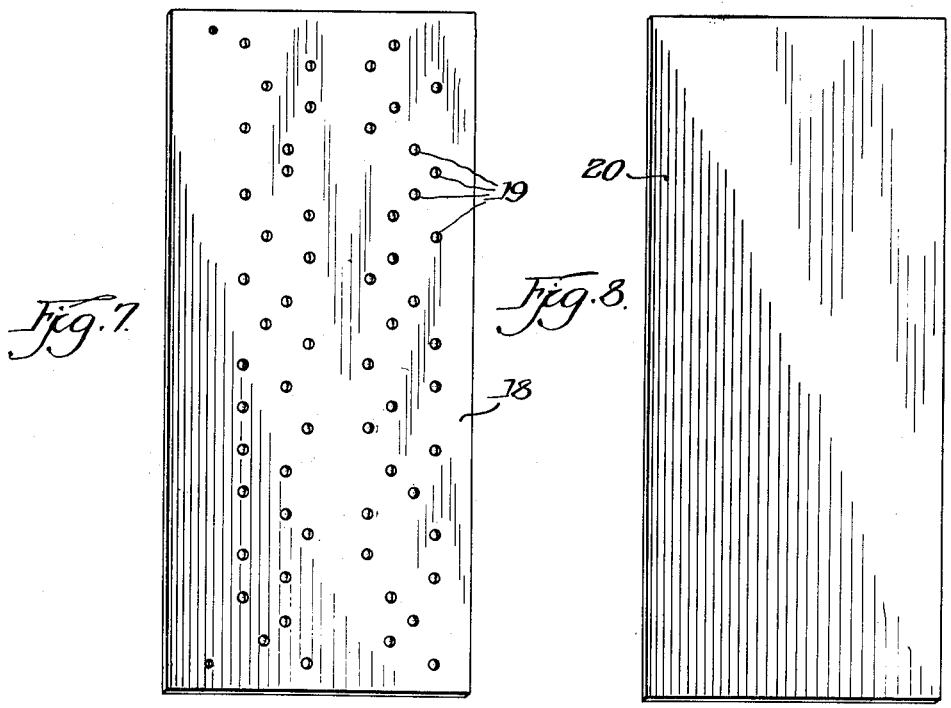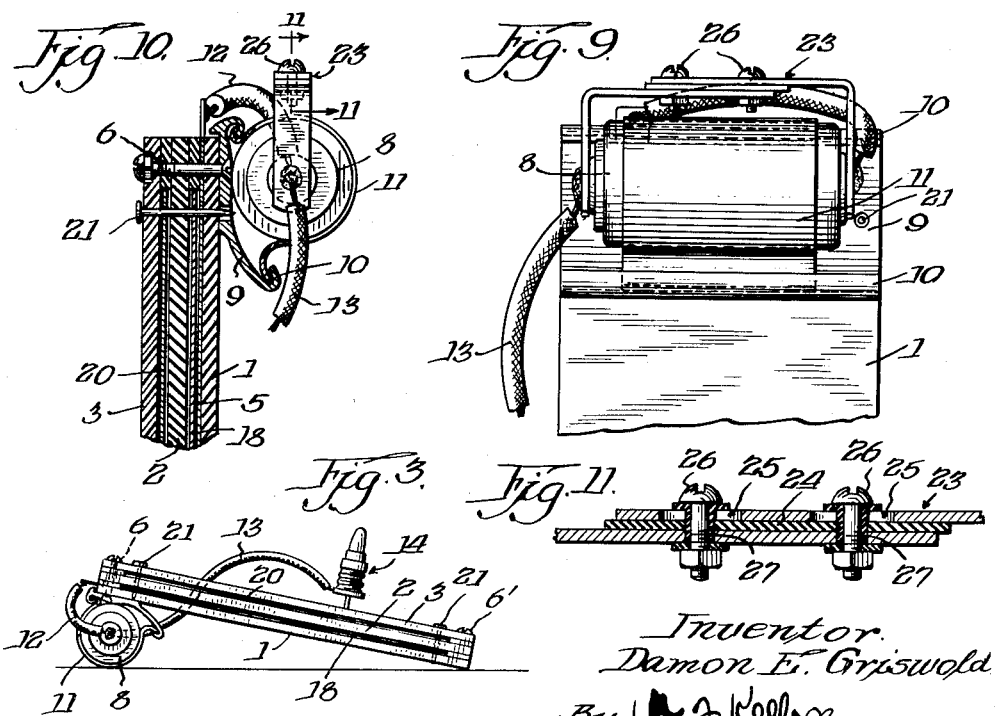

2,943,400
TESTING AND TEST RECORDING DEVICE

Damon E. Griswold, P.O. Box 145, Princeville, Ill.

Filed Jan. 14, 1959, Ser. No. 786,846

2 Claims. (Cl. 35—9)

This invention relates to improvements in self-testing and grade marking facilitating devices, particularly advantageous for or in the giving of examinations or tests of the elected best answer, multiple choice or true or false characters, having for an object to provide a device which, by simple method of usage, will indicate the correctness of the test taker's answers as and when made by a user and at the same time, produce an accurate and readily gradeable record of such answers.

It is also an object of the invention to provide an indicating and recording device of the tell-tale type which is small, readily portable, constructionally self-contained, durable and relatively inexpensive to produce.

A further object of the invention is to provide a testing and test recording device wherein the electrical energy supplying and utilizing components thereof are arranged and secured in assembled relation in such a manner that they may be readily used, renewed or replaced as required; moreover, in certain instances, serve a dual function, first, as a source of energy for the device indicator and second, as a supporting leg for the device whereby it will be supported in a conveniently usable position.

The foregoing, as well as other objects, advantages and meritorious teachings of my invention, will be in part obvious and in part pointed out in the following detailed disclosure thereof, when taken in conjunction with the accompanying drawings, it being understood that the forms of the invention presented herein are precise and what are now considered to be the best modes of embodying its principles, but that other modifications and changes may be made in specific embodiments without departing from its essential features.

In the drawings:

Figure 1 is a top side view of my self-testing and grade marking facilitating device.

Figure 2 is a longitudinal section therethrough taken on the line 2—2 of Figure 1, looking in the direction in which the arrows point.

Figure 3 is a reduced side elevation of the device showing it in position for usage.

Figure 4 is an enlarged fragmental longitudinal section taken on the line 4—4 of Figure 1, looking in the direction in which the arrows point.

Figure 5 is an enlarged fragmental transverse section taken on the line 5—5 of Figure 1, looking in the direction in which the arrows point.

Figure 6 is a view like Figure 5, but taken on the line 6—6 of Figure 1, looking in the direction in which the arrows point.

Figure 7 is a face view of the rupture resistant test master or key sheet.

Figure 8 is a face view of the rupturable test sheet.

Figure 9 is a fragmentary elevation of the bottom side of the device wherein a modified form of disconnectable battery electrical contact means is employed.

Figure 10 is a fragmental longitudinal section through the device shown in Figure 9 with the electrical battery and electrical contact means shown in end elevation, and, Figure 11 is an enlarged fragmentary longitudinal section through a portion of the battery electrical contact means taken on the line 11—11 of Figure 10, looking in the direction in which the arrows point.

Referring in detail to the drawings, particularly, to the form of my invention illustrated by Figures 1 through 8, the same comprises substantially rigid sheet-like bodies 1, 2 and 3 of complemental shape and size (preferably rectangular) which may be made of plastic or other suitable electrically non-conductive material either transparent, translucent or opaque. Said bodies are arranged and retained in relative superposed and spaced relation by electrically non-conductive strips 4 interposed therebetween at their opposite ends and one side whereby to constitute or form area extending pockets between the bodies 1 and 2, and 2 and 3.

A fourth sheet-like body 5 of thickness less than the depth of the adjacent area extended pocket and made of metal or other electrically conductive material corresponding in shape and size to the bodies 1, 2 and 3, overlies the body 1.

The electrically non-conductive and conductive bodies 1, 2, 3 and 5 and the strips 4 are fixedly secured in the aforedescribed assembled relation by engaging bolts 6 and 6' therethrough, the former being of lengths greater than the latter for a reason hereinafter described.

The bodies 2 and 3 are formed with a plurality of rows of relatively equi-spaced and aligned or registered openings 7, while the bodies 1 and 5 are imperforate or solid.

To provide a source of electric energy to the device, a dry cell battery 8 is employed. In order that it will be mounted on and secured to said device, a bracket plate 9, having relatively parallel inturned flanges or tracks 10 on its opposite sides, is positioned adjacent and transversely of the normally upper end of the device body assembly, i.e., adjacent the body 1, and is fixedly connected thereto by engaging the aforesaid longer bolts 6 therethrough in the manner shown in Figure 2. Said battery 8 is arranged on and longitudinally of the exposed side of the bracket plate between its side flanges and is connected or secured thereto by a clamping band 11 engaged over and about the same and having its opposite sides outturned and engaged in said bracket plate flanges.

Being so mounted on and secured to the body assembly of the device, it will be seen and appreciated that the battery serves a dual purpose. In addition to supplying electrical energy, it will serve as a supporting leg for the device, specifically, for its normally upper end. Thus, as and when the device is used, it will be supported at an incline in the manner shown in Figure 3 of the drawings for usage convenience.

One pole of the battery is electrically connected by a conductor 12 to a contact terminal 5' extended from the electrically conductive body 5. Its remaining pole has a flexible conductor 13, of suitable length, connected thereto.

An indicator unit, generally identified by the numeral 14, is connected to the remaining end of the flexible conductor 13. Said indicator consists of an electric lamp socket fixture 15 having a lamp 16 engaged therein and a pin or stylus 17 fixed and electrically connected to and extended from the socket fixture base. The diameter of the stylus is such that it will be enterable into and through the openings 7 in the sheet-like bodies 2 and 3.

A master or key sheet 18, made of rupture resistant material and of shape and size substantially corresponding to that of the area extended pocket between the bodies 1 and 2, is flatly insertable into said pocket. It is formed at predetermined points therein with a plurality of openings 19 so located as to align or register only with certain of the aligned or registered openings 7 in the bodies 1 and 2 when fully introduced into the pocket therebetween.

A test sheet 20, made of suitable rupturable material (paper, etc.) and of shape and size substantially corresponding to the second area extended pocket between the bodies 2 and 3 is flatly insertable thereinto. Said sheet is solid, i.e., without openings or perforations of any sort.

To retain the flatly inserted sheets 18 and 20 within their respective pockets between the bodies 1 and 2 and 2 and 3, I may and preferably do removably engage headed locking pins 21 through appropriate registered openings in the opposite ends of the device bodies assembly and through adjacent portions of said sheets.

To facilitate the conducting of a test with the use of my invention, the outer face of the sheet-like body 3, preferably, has numerals 22 or other indicia presented thereon in cooperative or indicative association with its rows of equi-spaced openings 7.

In the Figures 9–11 of the accompanying drawings, I have shown a different form of means for connecting the poles of the battery 8 to the electrically conductive sheet-like body 5 and the indicator unit 14. By this modified form, convenient and quick connection and/or disconnection between said body 5, unit 14 and the battery 8 will be effected. Herein, I provide an inverted U-shaped clip or yoke 23 made of substantially L-shaped sections of spring metal whose corresponding leg portions are arranged in overlapping relation with an insulating strip 24 interposed therebetween. One of said leg portions is formed with longitudinal slots 25 and the adjacent corresponding leg portion is formed with openings corresponding in placement to the slots. Bolts 26, electrically insulated, as at 27, from the L-shaped sections are engaged through the slots and openings in their leg portions, as shown in Figure 11, and are adjustably interconnected thereby. The angularly disposed end portions of the clip are springingly engaged or contacted with the battery poles (see Figures 9 and 10) and the adjacent ends of the conductors 12 and 13 are soldered or otherwise connected thereto. Thus, as and when it becomes necessary to replace the battery 8 with a new one, the clip or yoke 23 is disengaged therefrom. Thereupon, the battery clamping band 11 is disengaged from the bracket plate and a new battery is substituted. With a new battery mounted on and secured to the bracket plate, the clip 23 is engaged with the poles of the battery and the device is ready for use.

In using the invention, a master sheet 18 is flatly inserted into the pocket between the sheet-like bodies 1 and 2. Thereupon, an answer sheet 20 is flatly inserted in the pocket between the sheet-like bodies 2 and 3. Both sheets are then locked in their inserted positions by engaging the locking pins 21 therethrough.

As hereinbefore described, the master or key sheet 18 is provided with openings 19 arranged in a predetermined manner. Certain of these openings in the master sheet align or register with certain of the openings 7 in the sheet-like bodies 2 and 3. They are, however, concealed from view by the overlying or previously inserted answer sheet 20, which, as will be understood, is solid, i.e., without openings or perforations. The user in carrying out the test with the thus prepared device of the invention selects one of the openings in the various rows, noting, as and when he selects, the indicia associated therewith. Having made such selection, he enters the stylus 17 of the indicator unit 14 into the selected opening and forces or pushes the same inwardly so that it pierces the adjacent portion of the answer sheet 20.

If the user has selected or chosen the answer correct opening, as above, the stylus will pass through the registered opening 19 in the master or key sheet 18 into electrical contact with the electrically conductive sheet-like body 5 in the manner shown in Figures 4 and 6 of the drawings. However, if the user has erroneously selected, as and when the stylus of the indicator penetrates or pierces the rupturable answer sheet 20, its inner end is brought into engagement with the rupture resistant master or key sheet 18 in the manner shown in Figure 5 of the drawings. This master or key sheet, because of its rupture resistant properties, is not penetrated by the indicator stylus. In consequence, said stylus is prevented from contacting the electrically conductive sheet-like body 5. Therefore, the closing of an electrical circuit through the lamp 16 of said indicator will be prevented.

As and when a test conducted with the usage of the invention is completed, the pins 21 are removed from the body assembly and the master sheet 18 and answer sheet 20 are removed. By noting the number of piercings of the answer sheet, the grading or marking of the test may be effected and/or calculated, i.e., if a number of piercings of the answer sheet has been effected for completing answer to a single question, then the ultimately correct answer would be downgraded, etc.

Of course, various methods or procedures of grade markings may be employed or followed—this without departing from the scope or spirit of the invention. By the same token, it will be understood that master or key sheets 18 bearing different relative positionings or arrangements of openings 19 therein will be used.

I claim:

1. A testing and recording device, comprising electrically non-conductive sheet-like bodies arranged and secured in superposed and spaced relation forming area extending pockets therebetween, certain of said bodies having aligning openings therein and the remaining body being without openings therein, electrical contact means on said remaining body in and exposed to the pocket between the same and the adjacent sheet-like body and to the openings therein, a non-rupturable master sheet removably located within the pocket between said remaining body and adjacent non-conductive sheet-like body and over said contact means having openings therein alignable with certain of the openings in said certain bodies, a rupturable test sheet removably located within the pocket between said certain bodies and over the master sheet, an electric battery disposed transversely of the lower side of said remaining body in proximity to one end thereof and directly though removably connected thereto, one pole of which is connected to said electrical contact means, and an electric lamp carrying stylus connected to the remaining end of said battery.

2. A testing and recording device, comprising electrically non-conductive sheet-like bodies arranged and secured in superposed and spaced relation forming area extending pockets therebetween, certain of said bodies having aligning openings therein and the remaining body being without openings therein, electrical contact means on said remaining body in and exposed to the pocket between the same and the adjacent non-conductive sheet-like body and to the openings therein, a non-rupturable master sheet removably located within the pocket between said remaining body and adjacent non-conductive sheet-like body and over said contact means having openings therein alignable with certain of the openings in said certain bodies, a rupturable test sheet removably located within the pocket between said certain bodies and over the master sheet, a bracket plate having relatively parallel inturned flanges on its opposite sides disposed transversely of the lower side of said remaining body in proximity to one end thereof, an electric battery seated on and disposed longitudinally of the bracket, a clamping band engaged over and about the battery having its opposite ends securingly engaged with the bracket plate inturned flanges, one pole of said battery being connected to said electrical contact means, and an electric lamp carrying stylus connected to the remaining pole of the battery.

References Cited in the file of this patent

UNITED STATES PATENTS

| | | |
|---|---|---|
| 1,518,845 | Foley | Dec. 9, 1924 |
| 2,551,083 | Angell | May 1, 1951 |
| 2,790,251 | Rhoten | Apr. 30, 1957 |